May 21, 1929.  J. Q. HEPNER  1,714,474

DILATOR

Filed Dec. 12, 1925

Jacob Q. Hepner,
Inventor

Patented May 21, 1929.

1,714,474

UNITED STATES PATENT OFFICE.

JACOB Q. HEPNER, OF LOS ANGELES, CALIFORNIA, ASSIGNOR OF ONE-HALF TO HENRIETTA E. PEARDON, OF LOS ANGELES, CALIFORNIA.

DILATOR.

Application filed December 12, 1923. Serial No. 680,248.

The invention relates to anatomical dilators and it consists in the novel features hereinafter described and claimed.

The object of my invention is to provide a dilator of simple and efficient form adapted to be used for dilating parts of the anatomy, as the rectum, vagina or mouth of the womb, and for applying liquid medicament or wash into or beyond the dilated parts.

Figure 1:
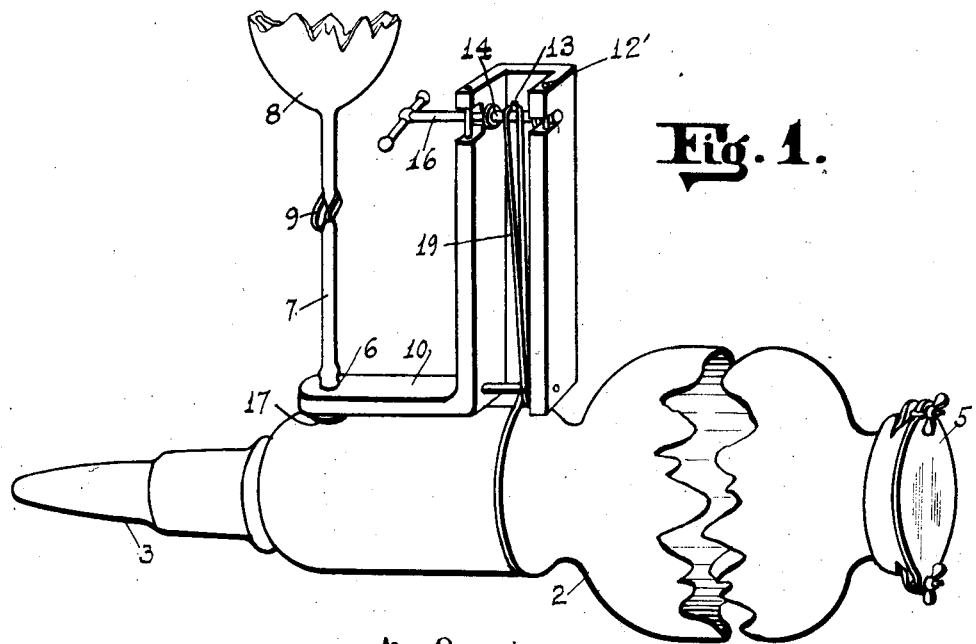
Figure 1 is a perspective view of the dilator having an intermediate portion of the container broken away.
Figure 2:
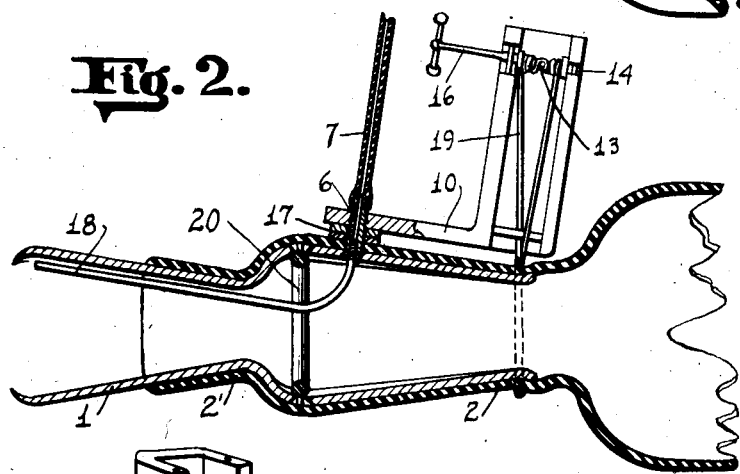
Figure 2 is a longitudinal sectional view thereof, the dilator shown extended.
Figure 3:
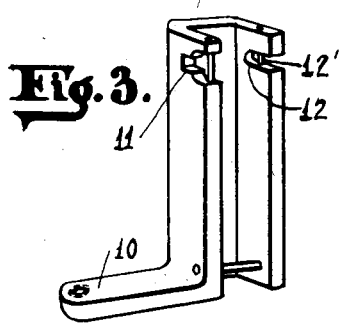
Figure 3 is a perspective view of arm 10.
Figure 4:
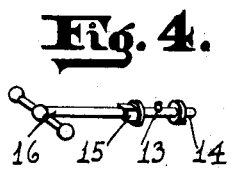
Figure 4 is a perspective view of a shaft used in connection with this improved dilator.

The dilator consists of a set of articulated spreader sections 1, arranged in the general form of a cone. The spreaders are encased in a rubber container 2, of a general cylindrical form and having a diametrically reduced or tapered end portion 2' which snugly receives the reduced portion of the sections 1. The pointed end of the container is closed by a rubber cap 3 which is removed when the dilator is to be used. The flange plate 5 which is attached to the container hermetically closes the large end of the container.

The container may contain a liquid and when the pointed end thereof is inserted, the outer portion of the container may be collapsed by pressure, whereby the liquid is forced from the pointed end portion of the container into and upon the parts of the anatomy to which the dilator is applied. A nipple 6 is attached to one of the spreader sections and passes through the side of the container and connects with a tube 7, which, in turn, connects with a liquid fountain or bag 8. A clip 9 is mounted upon the tube for interrupting the flow of liquid therethrough.

An arm 10 is threaded unto the nipple 6 and is screwed down tight against the rubber washer 17. The arm 10 is provided with a socket 12 and a shaft 14 having a square shoulder 15 and a handle 16 and is journaled in said socket, said shaft being held in said socket by a pin 12' which is passed through the socket.

A tube 18 connects with nipple 6 which extends along the reduced end portion of the spreader and out to the tip of the small end of the container. The fountain 8 may contain a medicated liquid and when the dilator is applied the said liquid may flow by gravity from the fountain bag through the tube and be deposited upon and beyond the parts of the anatomy which are dilated by the spreader.

An endless cord surrounds the container at the outer spaced end portions of the sections 1 of the spreader and is connected to a pin 13 which is mounted on the shaft 14 intermediate of its ends. Thus when the shaft is rotated the cord is wound thereon whereby the outer spaced ends of the spreader are drawn toward each other and the diametrically reduced or smaller ends thereof are spread apart. As the smaller end portions thereof are inserted in the parts of the anatomy to be dilated, the part is expanded and the liquids may be applied as herein stated. The sections of the spreaders are kept in position by the ring 20 which allows the spreader sections to swing or rock as the cord is wound upon the shaft.

Having described my invention that which I claim to be new and desire to procure by Letters Patent is:

1. In a device of the character described a dilator and means for spreading the same, a medicament container surrounding said dilator, a fluid container connected to said dilator, a tube extending from said second container to the terminal of the dilator, means forming a passageway extending from said first container to the terminal of the dilator, and a ring forming part of the dilator to keep the spreading means apart.

2. In a device of the character described a dilator and means for spreading the same, a medicament container surrounding said dilator, a fluid container connected to said dilator, a tube extending from said second container to the terminal of the dilator, said first container having communication with the terminal of the dilator, and a ring forming part of the dilator to keep the spreading means apart, said spreading means having spread apart terminals.

3. In a device of the character described a dilator and means for spreading the same, a medicament container surrounding said dilator, a fluid container connected to said dilator, a tube extending from said second container to the terminal of the dilator, said first container having communication with the terminal of the dilator, a ring forming part of the dilator, said spreading means having spread apart inner ends and means for drawing said inner ends together to spread the outer parts of said spreading means.

4. In a device of the character described a dilator and means for spreading the same, a medicament container surrounding said dilator, a fluid container connected to said dilator, a tube extending from said second container to the terminal of the dilator, said first container having communication with the terminal of the dilator, a ring forming part of the dilator, said spreading means having spread apart inner ends, and means for drawing said inner ends together to spread the outer parts of said spreading means, said means consisting of a cord encircling said container and the inner ends of said spreading means.

5. In a device of the character described a dilator and means for spreading the same, a medicament container surrounding said dilator, a fluid container connected to said dilator, a tube extending from said second container to the terminal of the dilator, said first container having communication with the terminal of the dilator, a ring forming part of the dilator, said spreading means having spread apart inner ends, means for drawing said inner ends together to spread the outer parts of said spreading means, said means consisting of a cord encircling said container over the inner ends of said spreading means, and means for contracting said cord.

6. In a device of the character described a dilator and means for spreading the same, a medicament container surrounding said dilator, a fluid container connected to said dilator, a tube extending from said second container to the terminal of the dilator, said first container having communication with the terminal of the dilator, a ring forming part on said dilator, said spreading means having spread apart inner ends and tightening means for drawing said inner ends of said spreading means together to spread the outer parts of said spreading means.

7. A dilator having a pair of spaced apart swingable sections, a flexible encasement mounted over the rear portions of said sections, means co-operable with the rear portions of said sections for forcing said rear portions inwardly, a container formed rearwardly of said encasement, and a second container having means extending through said encasement for discharging fluid therefrom to a point adjacent the forward end of said sections inwardly thereof.

In testimony whereof I affix my signature.

JACOB Q. HEPNER.